United States Patent
Shirakawa

(10) Patent No.: US 7,411,618 B2
(45) Date of Patent: Aug. 12, 2008

(54) WIRELESS TERMINAL COMPRISING A CAMERA AND HAVING FINE AND COARSE ELECTRONIC ZOOMING FUNCTIONS

(75) Inventor: Hirotsugu Shirakawa, Tokyo (JP)

(73) Assignee: NEC Corporation, Tokyo (JP)

( * ) Notice: Subject to any disclaimer, the term of this patent is extended or adjusted under 35 U.S.C. 154(b) by 825 days.

(21) Appl. No.: 10/782,876

(22) Filed: Feb. 23, 2004

(65) Prior Publication Data

US 2004/0166894 A1    Aug. 26, 2004

(30) Foreign Application Priority Data

Feb. 25, 2003   (JP) .............................. 2003-047585

(51) Int. Cl.
 *H04N 5/262* (2006.01)
(52) U.S. Cl. ................................... 348/240.2
(58) Field of Classification Search ............ 348/240.99, 348/240.1, 240.2, 240.3, 373, 374, 375, 376
See application file for complete search history.

(56) References Cited

U.S. PATENT DOCUMENTS

| | | | |
|---|---|---|---|
| 6,009,336 A | | 12/1999 | Harris et al. |
| 6,151,070 A | * | 11/2000 | Sato et al. ............. 348/240.99 |
| 6,509,927 B1 | * | 1/2003 | Prater et al. ............. 348/222.1 |
| 6,693,667 B1 | * | 2/2004 | Doron ................... 348/240.99 |
| 7,098,949 B2 | * | 8/2006 | Stavely ..................... 348/240.2 |
| 2001/0055066 A1 | | 12/2001 | Nozawa |
| 2002/0142810 A1 | | 10/2002 | Kawasaki et al. |
| 2002/0158973 A1 | | 10/2002 | Gomi |
| 2004/0048633 A1 | * | 3/2004 | Sato et al. ................. 455/556.1 |
| 2004/0077386 A1 | * | 4/2004 | Nagasawa ................. 455/575.1 |
| 2005/0157174 A1 | * | 7/2005 | Kitamura et al. ........ 348/207.99 |

FOREIGN PATENT DOCUMENTS

| | | |
|---|---|---|
| EP | 0 954 150 A2 | 11/1999 |
| JP | 2002-77698 A | 3/2002 |

OTHER PUBLICATIONS

G.C. Neto, "Methods for Image Interpolation Through Fir Filter Design Techniques," International Conference on Acoustics, Speech & Signal Processing. ICASSP, Boston, Apr. 14-16, 1983, pp. 391-394.

* cited by examiner

*Primary Examiner*—Lin Ye
*Assistant Examiner*—Nicholas G Giles
(74) *Attorney, Agent, or Firm*—Foley & Lardner LLP

(57) ABSTRACT

A camera installed in a wireless terminal comprises a first electronic zooming means to operate by hardware and a second electronic zooming means to operate by software. The first electronic zooming means quickly select one of several pictures with predetermined scale factor. The second electronic zooming means zoom in or out a picture in small steps. An operator can quickly display a picture of desired scale factor by these two means. Further, in a foldable type terminal with a magnetic sensor, a picture with desired scale factor can be displayed by adjusting an angle between a first housing and a second housing.

11 Claims, 6 Drawing Sheets

WIRELESS TERMINAL COMPRISING A CAMERA AND HAVING FINE AND COARSE ELECTRONIC ZOOMING FUNCTIONS

BACKGROUND OF THE INVENTION

1. Field of the Invention

The invention relates to a wireless terminal comprising a camera, more particularly, the wireless terminal that can quickly display a zoomed picture with a desired scale factor.

2. Description of the Related Prior Art

In late years cellular telephones with a camera spread rapidly. This camera comprises electronic zoom function rather than optical zoom function, because a housing of the cellular telephone has to be made thin as possible. Japanese Patent Laid-Open No. 2002-077698 bulletin discloses an example of a method to zoom in or zoom out a picture by means of an electronic zooming.

In an electronic zooming method, there are a method carried out by software and a method carried out by hardware. The electronic zooming method carried out by hardware performs cutout and pixel skipping of a picture. The method enables to form a picture with a normal scale factor and pictures with some fixed scale factors. However, a picture of an arbitrary scale factor cannot be formed. An operator, therefore, must change distance between a camera and an object to get a picture with a desired scale factor. The electronic zooming method carried out by software enables smooth zooming in small steps. However, as the number of the pixels of the picture increases, time to need for zooming increases. Particularly, it becomes difficult to display a picture with a desired scale factor when speed of zooming rises.

SUMMARY OF THE INVENTION

In a preferred embodiment of the invention, a wireless terminal has an first electronic zooming means to zoom in or out a picture of an object by hardware, a second electronic zooming means to zoom in or out the picture of an object by software, a control unit to control the first and second electronic means, a display and an operation key section. In this embodiment, the first and the second electronic zooming means select predetermined scale factor respectively. A scale factor of a selectable picture is adjustable. The number of a scale factor that the first electronic zooming means can select is less than the number of scale factor that the second electronic zooming means can select.

The wireless terminal can be a foldable type terminal that comprises a first housing and a second housing. This terminal can comprise a sensor outputting an output value that corresponds to an angle between the first housing and the second housing. The first or the second electronic zooming means can work according to the output value of the sensor.

This wireless terminal enables quick and smooth zooming operation.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENTS

Figure 1:
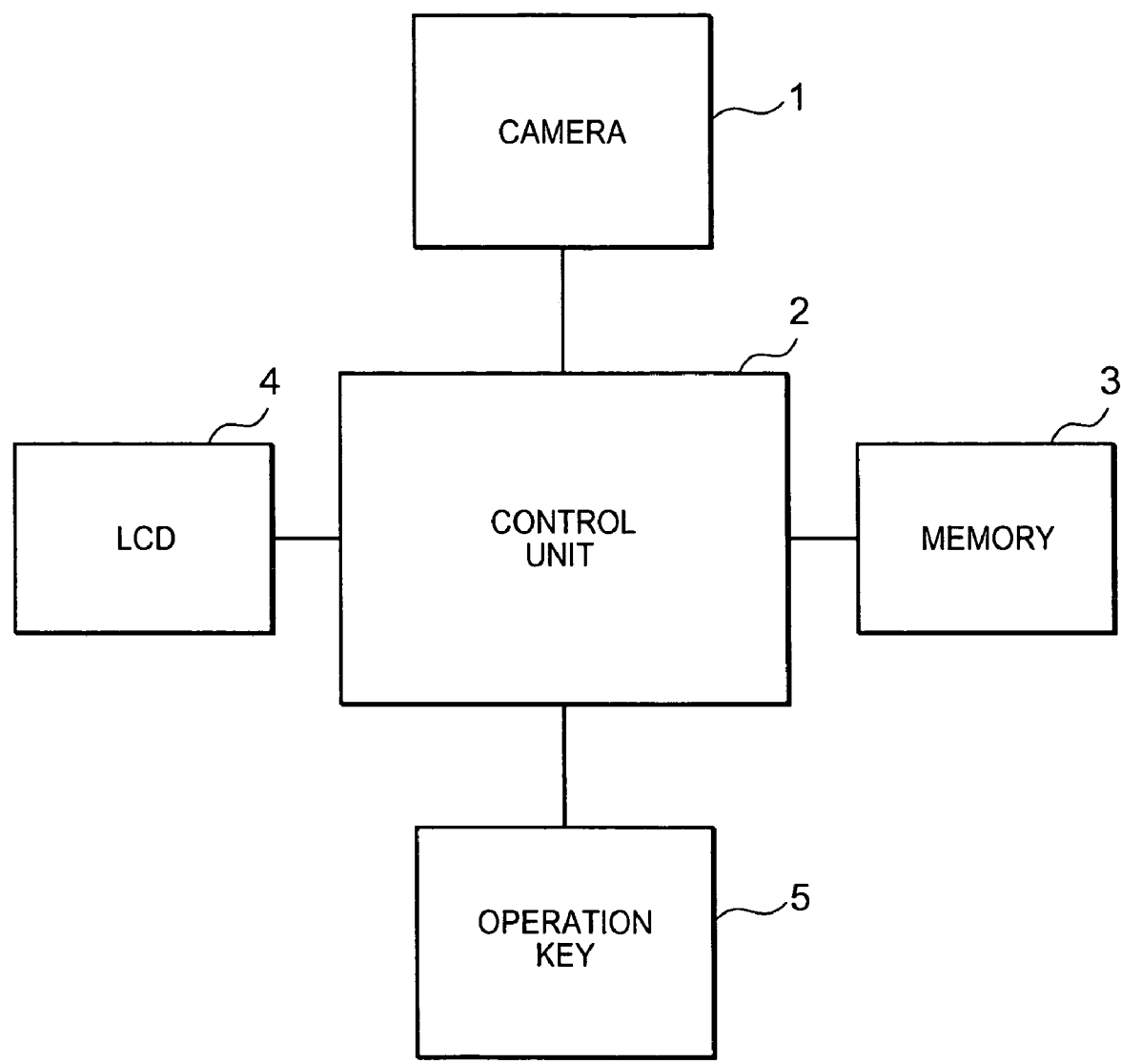
FIG. 1 shows a block diagram of an example of the wireless terminal.

FIG. 1 shows a block diagram of a cellular telephone with camera that is an example of a wireless terminal of the present invention. The cellular telephone has a camera section 1, a control unit 2, a memory 3 storing software, a LCD 4 and an operation key 5. The cellular telephone is a foldable telephone in which the first housing and the second housing were coupled with a hinge section. As for the cellular telephone, a straight type telephone having a housing can be utilized. The operation key 5 is a cross-shaped key. Camera 1 does not comprise optics zooming function, but electronic zooming function.

Figure 2:
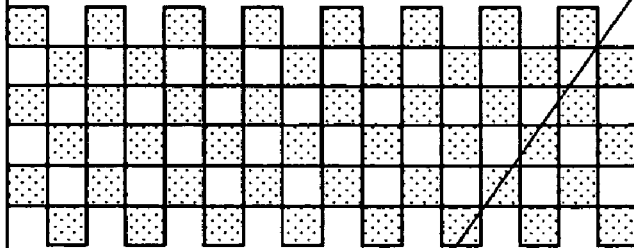
FIG. 2 shows an example of an electronic zooming method by hardware.

FIG. 2 shows an example of electronic zooming by hardware. In a picture displayed in the LCD of the camera, when one pixel is skipped in two pixels, for example, a picture reduced to ½ is displayed. Further, the picture reduced to ⅓ is displayed when two pixels are skipped in three pixels. As described above, one of limited several zoom pictures are selected step by step. Therefore, the electronic zooming by hardware cannot carry out zooming operation in small steps. An operator must adjust distance between the camera and an object in order to get a zoom picture with a desired scale factor.

Figure 3:
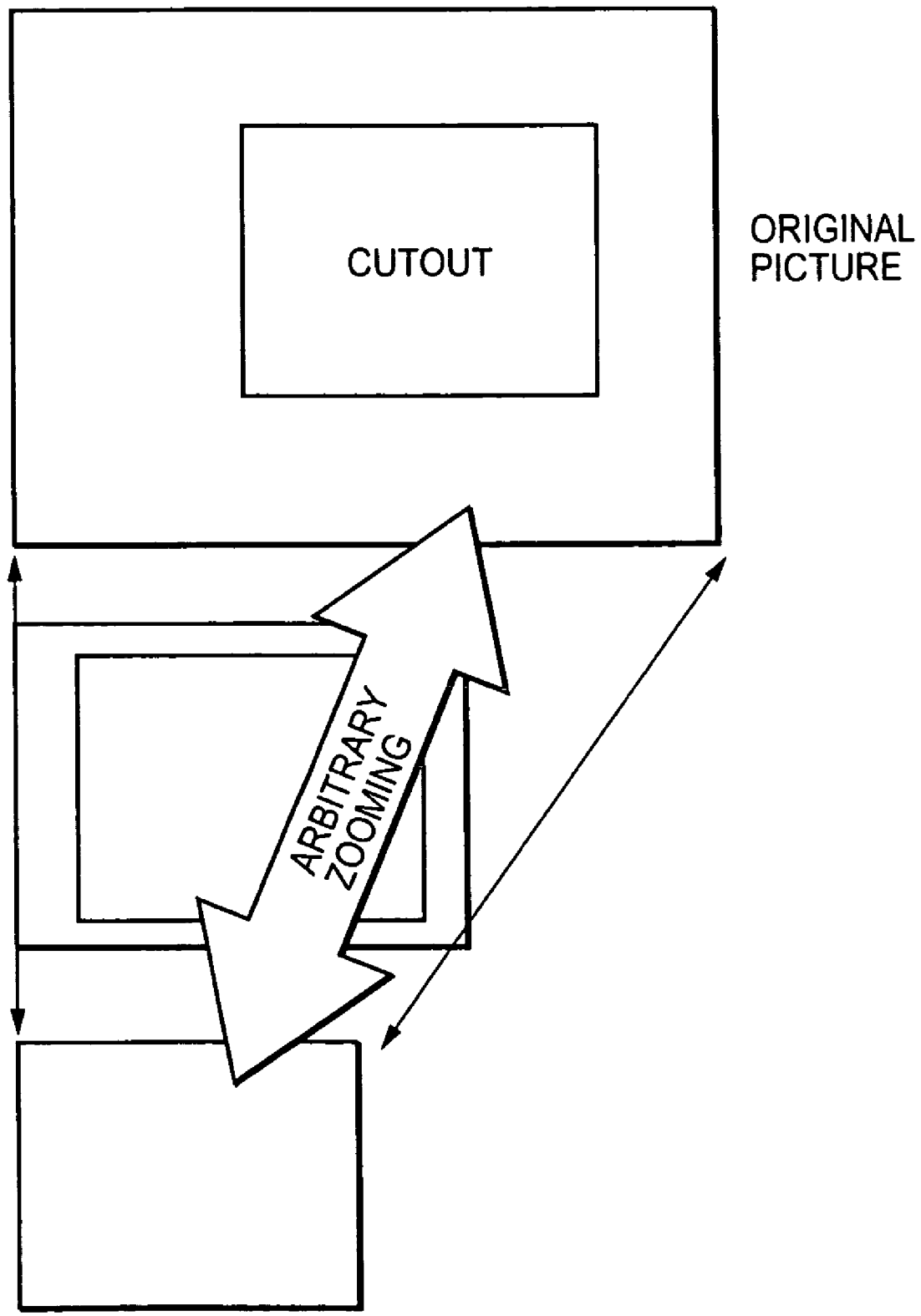
FIG. 3 shows an example of an electronic zooming method by software.

FIG. 3 shows an example of the electronic zooming by software. For algorithm used for operations such as transformation, expansion and reduction of picture, there are nearest-neighbor method, bi-linear method and bi-cubic method. The nearest-neighbor method calculates at what coordinate a pixel in a transformed picture was located ahead of transformation. A color of the pixel on the calculated coordinate is adopted as a color after picture transformation. In bi-linear method, weighted-average value of four colors in circumference of an interpolation point is adopted as a color of the interpolation point. Since mean value of colors of plural pixels is employed, a picture after transformation includes the color that is not included in a picture before transformation. Bi-cubic method carries out interpolation using cubic function based on values of 16 pixels in circumference of interpolation point. The algorithm changes a scale factor of a picture in small steps to zoom in or out the picture. However, zooming by software needs many steps. As a result, zooming operation needs long time. Further, if zooming speed becomes higher, it becomes difficult to smoothly adjust a picture to an arbitrary scale factor. Therefore, usability deteriorates. According to the present invention, an operator combines smooth zooming process by software and high-speed zooming process by hardware.

Figure 4:
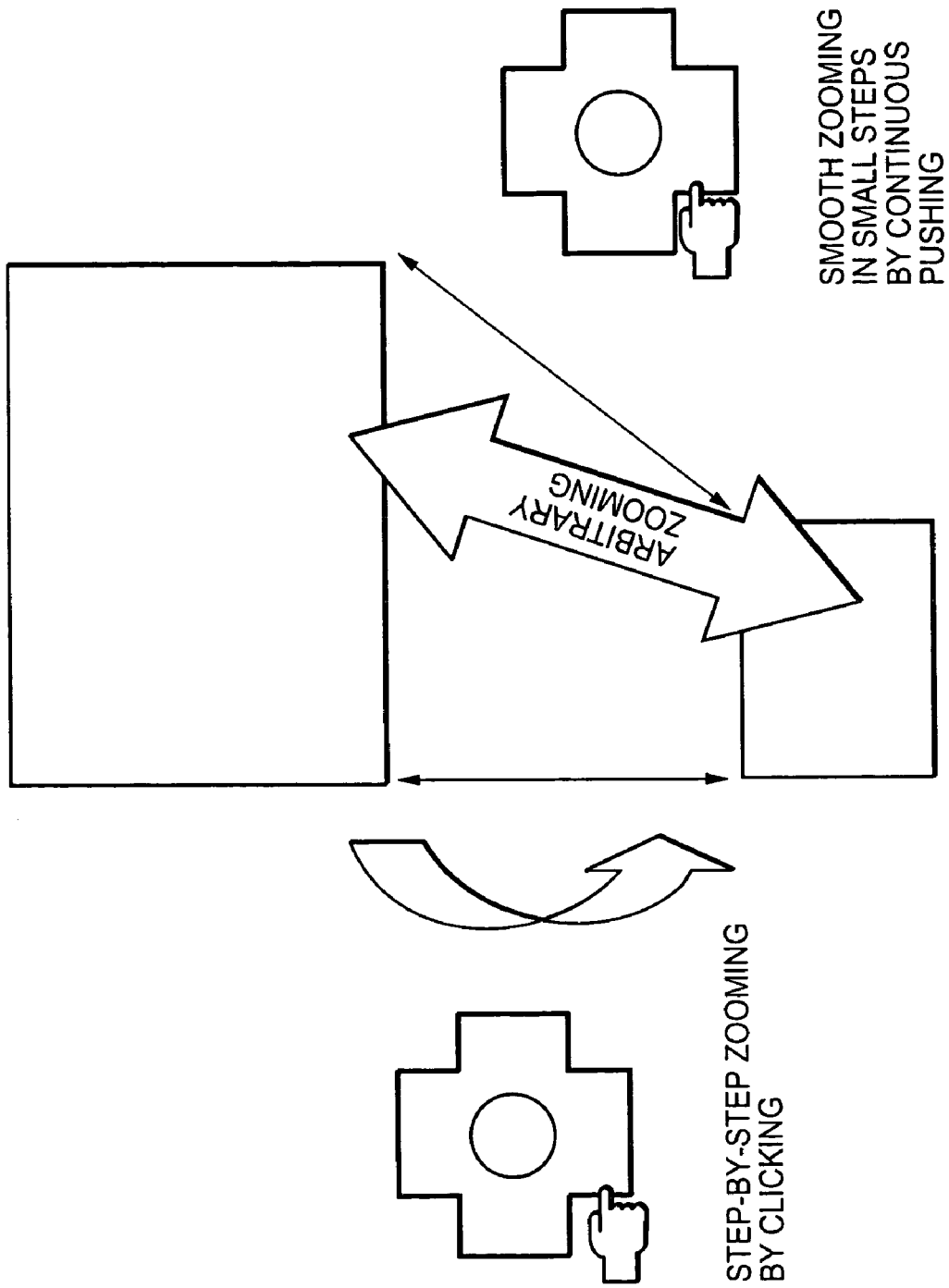
FIG. 4 shows an example of electronic zooming operation.

FIG. 4 shows an example of an operation in a cellular telephone comprising a cross-shaped key as the operation key. An operator clicks the cross-shaped key one or several times to display a picture of the scale factor which is near to a desired zoomed picture. The operator continuously operates the cross-shaped key to finely tune a zooming scale factor. In this example, continuous pushing an upper part of the cross-shaped key zooms in a picture and continuous pushing a lower part of the key zooms out the picture.

Figure 5:
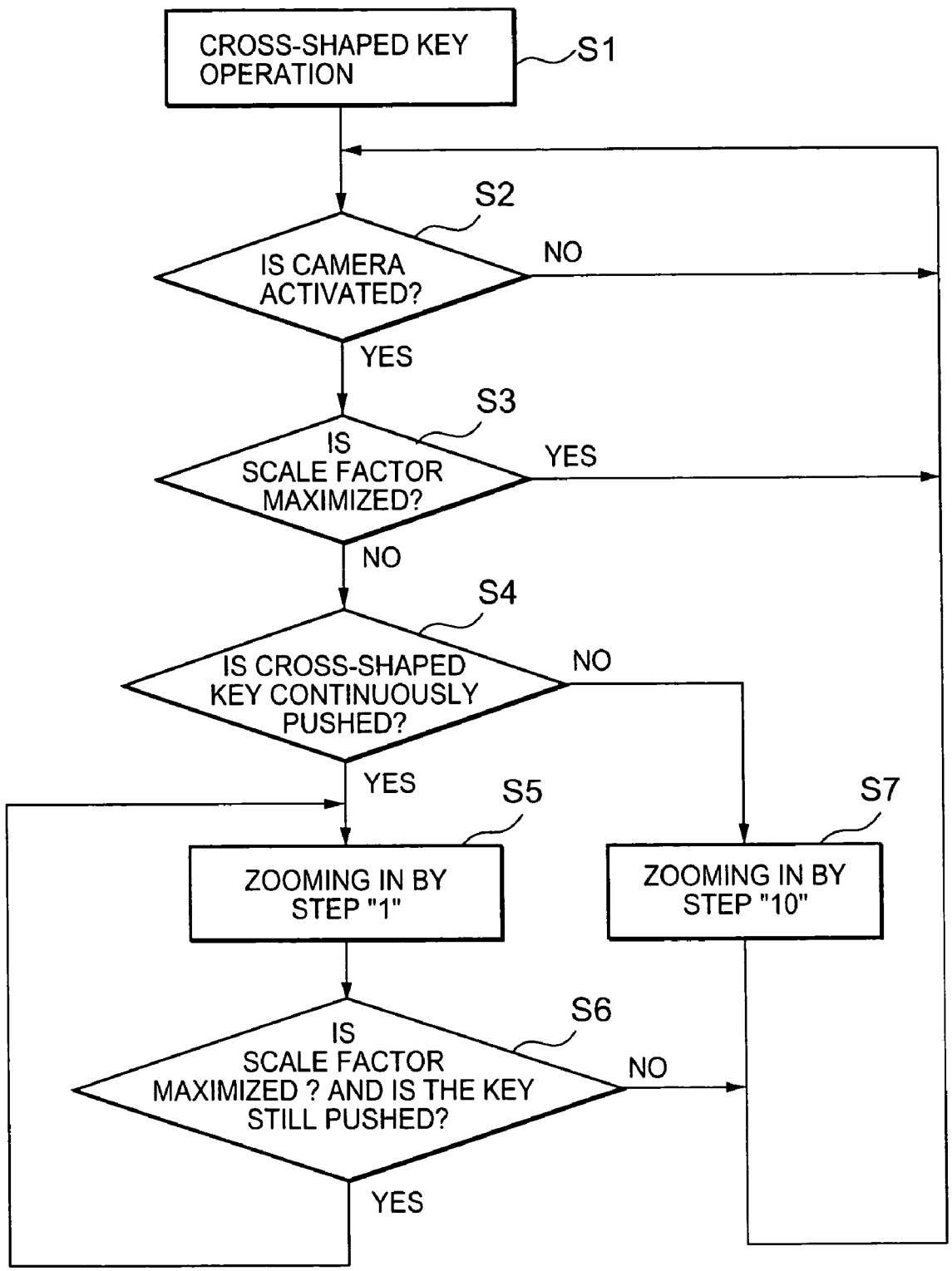
FIG. 5 shows an example of a flow of electronic zooming operation.
Figure 6:
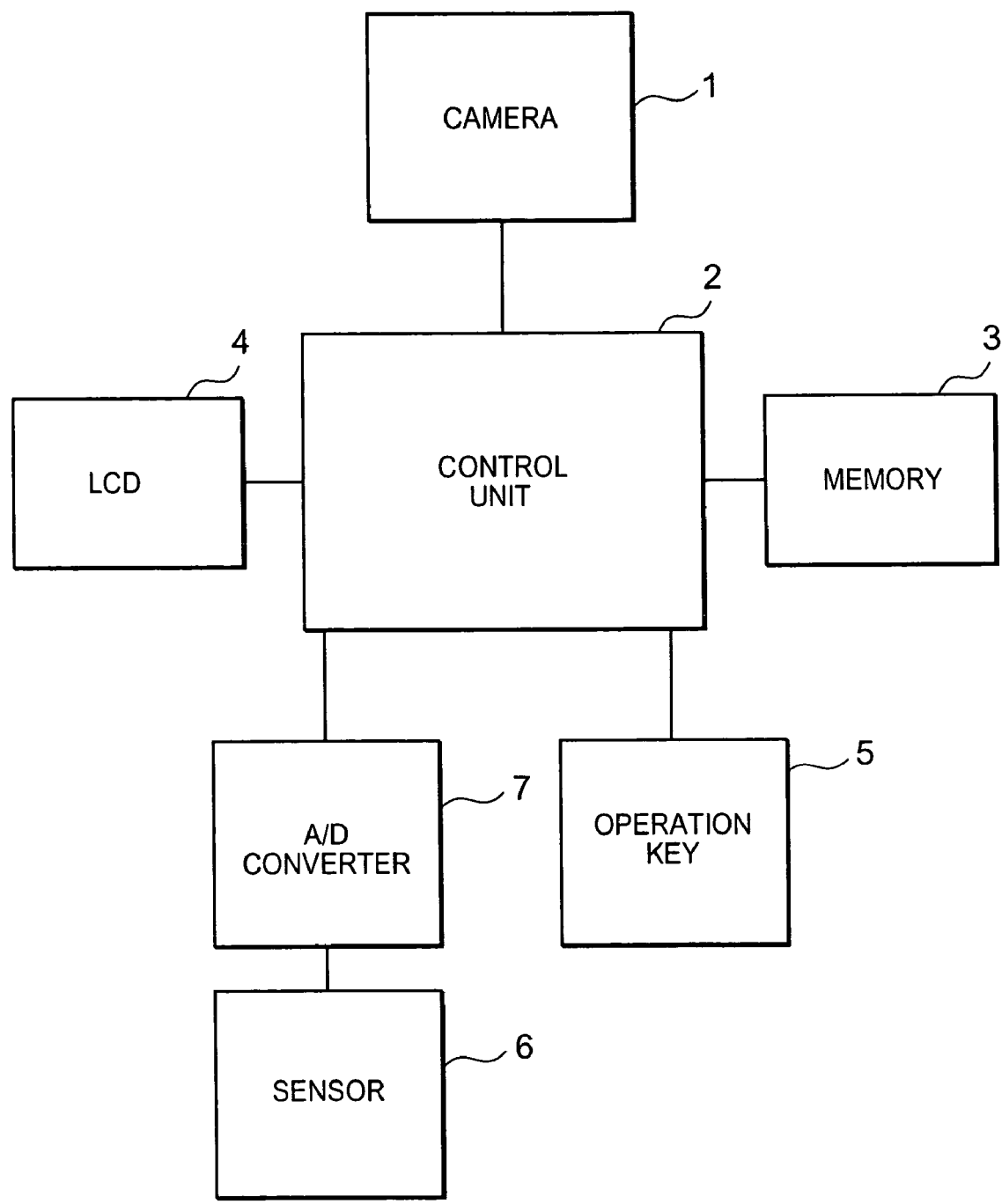
FIG. 6 is a block diagram of other example of the wireless terminal.

FIG. 5 shows an example of a zooming operation flow. For example, continuous pushing the cross-shaped key zooms in or out a picture by zooming step "1", and clicking the key zooms in or out the picture by zooming step "10". The zooming step is adjustable. FIG. 5 shows the example that the operator magnifies (or zooms in) a picture. The operation of zooming out a picture has the same flow as that shown in FIG. 5. The operator operates the cross-shaped key to start zooming operation (S1) It is determined whether a camera is activated (S2). When the camera is activated (YES of S2), it is determined whether a zooming scale factor is maximized (S3). When a zooming scale factor is not maximized (NO of S3), an operation mode of the cross-shaped key is determined (S4). When the cross-shaped key is clicked (NO of S4), the picture is magnified (or zoomed in) by zooming step "10" (S7). When the cross-shaped key is continuously pushed (YES of S4), the picture zooms in by zooming step "1" (S5). When the cross-shaped key is more continuously pushed (YES of S6), the picture continues to zoom in by zooming step "1" (S5). In the operation flow, the operator selects a suitable cross-shaped key operation mode to smoothly and quickly display a picture with a desired scale factor. FIG. 6 shows a block diagram of a cellular telephone of a different embodiment. The telephone additionally has an A/D converter 7 and a sensor 6. For example, the cellular telephone has a first housing, a second housing and a hinge section that combines the housings. For example, the first housing comprises a magnetic sensor, and the second housing comprises a magnet. This magnetic sensor outputs an output value almost corresponding to an angle between the first housing and the second housing. The A/D converter 7 converts the output value and the control unit 2 selects a corresponding scale factor of a picture based on the converted value. Therefore, the operator can almost adjust a scale factor of a picture by means of changing the angle between the first housing and the second housing. In this example, a foldable type cellular phone has a liquid crystal display (LCD) on a back side and a front side. Watching a picture of the LCD on the back side, the operator can adjust a zooming scale factor of the picture. Both of the magnetic sensor and the magnet are located at opposite end of the hinge section. An operator can select whether the first electronic zooming means or the second electronic zooming means operate according to the output value of the sensor.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. A wireless terminal comprising a camera, comprising:
   a first electronic zooming means for zooming in or out a picture of an object by hardware;
   a second electronic zooming means for zooming in or out a picture of an object by software;
   a control unit for controlling the first and the second electronic zooming means;
   a display; and
   an operation key,
   wherein the first electronic zooming means is operated by a user clicking the operation key one or more times to display a picture of a scale factor which is near to a desired zoomed picture, and
   wherein the second electronic zooming means is operated by a user continuously pushing the operation key to finely tune a zooming scale factor to smoothly and quickly display a picture with a desired scale factor.

2. The wireless terminal of claim 1 wherein the first and the second electronic zooming means select a picture of a predetermined scale factor respectively.

3. The wireless terminal of claim 2 wherein a scale factor of the selectable pictures is adjustable.

4. The wireless terminal of claim 2 wherein the operation key section is a cross-shaped key.

5. The wireless terminal of claim 1 wherein the number of pictures that the first electronic zooming means can select is less than the number of pictures that the second electronic zooming means can select.

6. The wireless terminal of claim 1 wherein a first housing and a second housing are coupled by a hinge section to form a foldable type terminal.

7. The wireless terminal of claim 1 wherein the second electronic zooming means uses software based on nearest-neighbor method.

8. The wireless terminal of claim 1 wherein the second electronic zooming means uses software based on bi-linear method.

9. The wireless terminal of claim 1 wherein the second electronic zooming means uses software based on bi-cubic method.

10. A method for operating a wireless terminal comprising a camera comprising the steps of:
    zooming in or out a picture by a first electronic zooming means based on hardware;
    zooming in or out a picture by a second electronic zooming means based on software,
    wherein the first electronic zooming means is operated by a user clicking an operation key one or more times to display a picture of a scale factor which is near to a desired zoomed picture, and
    wherein the second electronic zooming means is operated by a user continuously pushing the operation key to finely tune a zooming scale factor to smoothly and quickly display a picture with a desired scale factor.

11. A wireless terminal comprising a camera, comprising:
    a first electronic zooming unit configure to zoom in or out a picture of an object by hardware;
    a second electronic zooming unit configured to zoom in or out a picture of an object by software;
    a control unit for controlling the first and the second electronic zooming units;
    a display; and
    an operation key,
    wherein the first electronic zooming unit is operated by a user clicking the operation key one or more times to zoom the picture of the object in large increments for each click of the operation key, and
    wherein the second electronic zooming unit is operated by a user continuously holding the operation key in a pushed position to zoom the picture of the object in small increments.

* * * * *